Dec. 16, 1941.   R. M. JOYCE   2,266,640
COTTON DRYING TOWER
Filed Feb. 10, 1939
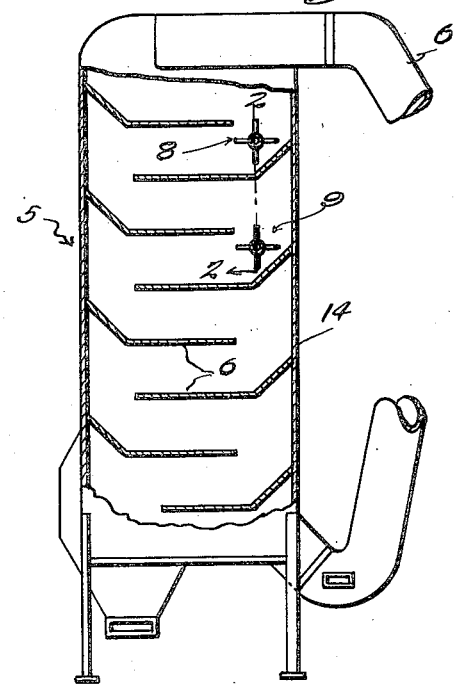
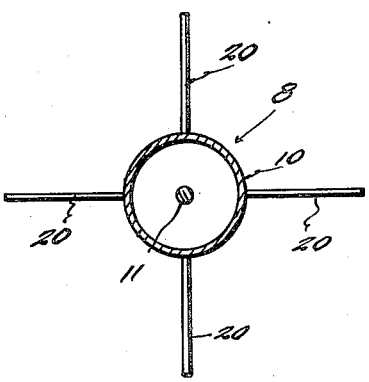
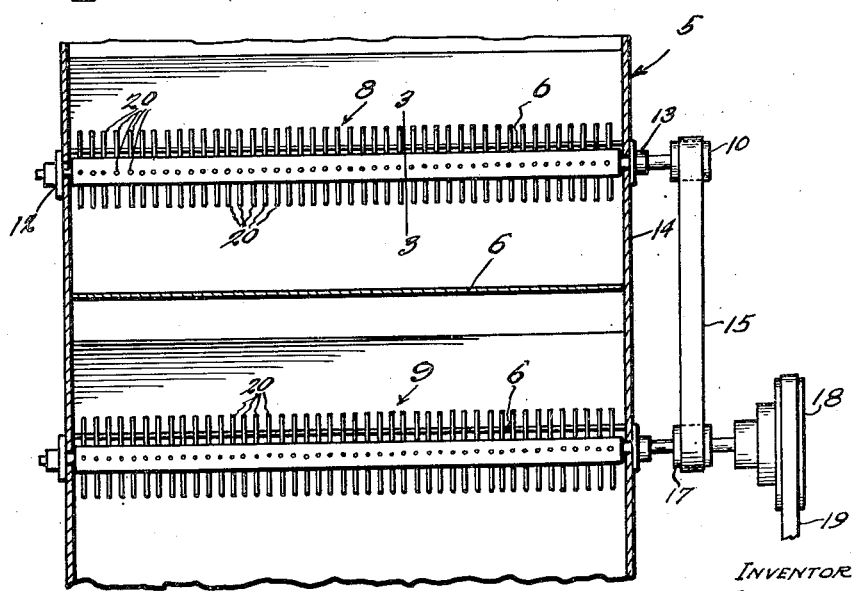
INVENTOR
Robert M. Joyce
By Clarence A. O'Brien
and Hyman Berman
Attorneys Patented Dec. 16, 1941

2,266,640

UNITED STATES PATENT OFFICE 2,266,640

COTTON DRYING TOWER

Robert M. Joyce, Greenville, Miss.

Application February 10, 1939, Serial No. 255,789

6 Claims. (Cl. 34—57)

My invention relates to improvements in cotton drying towers, similar to the Bennett cotton drying tower, and particularly to provision of means for controllably retarding the movement of the cotton introduced into the tower, along the drying floors of the tower, so that the dehydrated heated air is caused to more completely and uniformly dry the cotton in the tower, so that there is discharged from the tower a more uniform batch of cotton, as to dryness and density, whereby the effect of two-sample bale cotton is eliminated, and the cotton discharged by the drier rendered capable of being ginned more uniformly and without damage.

Other important objects and advantages of my invention will be apparent from a reading of the following description taken in connection with the drawing, wherein for purposes of illustration I have set forth a preferred embodiment of my invention.

In the drawing—

Figure 1 is a general vertical transverse sectional view taken through a conventional cotton drying tower, such as a Bennett tower, showing the cotton retarding means in accordance with the present invention.

Figure 2 is an enlarged fragmentary transverse vertical sectional view taken through Figure 1 approximately on the line 2—2 and looking toward the left in the direction of the arrow.

Figure 3 is an enlarged transverse vertical sectional view taken through Figure 2 approximately on the line 3—3.

Referring in detail to the drawing, the numeral 5 generally designates the drying tower which has the staggered vertically spaced alternating floors 6 along which the moist cotton is moved by the drying air in alternate horizontal passages across the drier from the top to the bottom of the drier, after having been introduced into the top of the drier through the conduit 6. Ordinarily the moist cotton introduced into the top of the tower slides along the shelves or floors 6, and as the cotton dries under the application of the dehydrated heated air applied to the drier, the cotton rises above the floors and packs up, thereby retarding the uniform flow of the drying air through the cotton, and producing non-uniform movement of the cotton through the drier, resulting in a non-uniform condition of the cotton discharged from the drier. In accordance with the present invention there are placed at different levels in the drying tower, relative to selected floors 6 thereof, means for uniformly retarding the movement of the cotton, which means is adjustable as to operation to vary the rate of retardation effected, the retardation being uniform once adjusted, whereby the moist cotton is retarded and caused to remain for a sufficient length of time within the sphere of action of the drying air, so that the drying air can completely circulate through the cotton and absorb and carry off the moisture from the cotton, so that the cotton which is discharged from the drier is in a uniformly dried state. Thus it is made possible to produce a uniformly dried cotton product even though the cotton introduced into the drier is made up of pickings in various stages of dampness, with the practical result that the cotton is of a better grade and worth more money than cotton dried by ordinary means.

Special means whereby the above desirable effects are achieved comprise in accordance with the present invention, retarding rollers generally designated 8 and 9 respectively, each of which has the form of a hollow cylinder 10 provided with ends supporting an axle 11 which is journaled in suitable bearings 12, 13 on the outer sides of the casing 14 of the drying tower as illustrated in Figure 2 of the drawing. A connecting belt 15 is trained over respective pulleys 16 and 17 on the projecting ends of the axles 11, the lower axle having a side pulley 18 over which is trained a drive belt 19 powered by suitable means (not shown).

The retarding rollers are located respectively just below the levels of the first and third floors of the drying tower as illustrated in Figure 1 of the drawing and in position between the free end of the said floors and the point of connection of the next floor to the opposed side of the drier, so that the rollers are in condition to receive and act upon the cotton without permitting any of the cotton to escape by to the next floor below without having been acted upon by the roller.

Each roller is composed, besides the hollow cylinder 10 on the axle 11 with longitudinally aligned equally circumferentially spaced series of spikes 20. Without intention to limit the scope of the invention, it is indicated for purposes of illustration that a typical drum or roller such as those designated 8 and 9, may be about 48 inches long, 4 inches in diameter, and be set with four rows of 4 inch by ¼ inch steel spikes, the spikes being set at a distance of two inches apart, and the drum mounted on a half inch axle or shaft 11, the drums to be run at a speed of from 60 to 120 revolutions per minute, depending on the amount of cotton to be handled.

Although I have shown and described herein a preferred embodiment of my invention, it is to be definitely understood that I do not desire to limit the application of my invention thereto, and any change or changes may be made in the materials, and in the structure and arrangement of the parts, within the spirit of the invention and the scope of the subjoined claims.

Having described the invention, what is claimed as new is:

1. A cotton drying tower having a damp cotton and drying air inlet at its upper end and dried cotton and air outlet means at its lower end, a plurality of vertically spaced floors mounted in the tower between the inlet and the outlet, major portions of said floors being horizontal, alternate ones of said floors being spaced from and attached to opposite sides of the interior of the tower so as to establish communication between the spaces above adjacent floors, and retarding means located at upper and intermediate points in the tower, said retarding means comprising a rotor journaled through the sides of the tower, and rows of spikes projecting from the surface of the rotor and arranged to receive the cotton from the free end of the overlying floor and act upon and retard the movement of the cotton to and along the subjacent floor.

2. In a device of the character described, a vertically elongated substantially air-tight casing, a plurality of vertically spaced floors mounted in said casing, major portions of said floors being horizontal, said floors having one end thereof secured to the wall of the casing and the opposite end spaced from the opposite wall of the casing with the free ends of adjacent floors staggered with respect to each other, a combined moist cotton and drying air inlet at the top of the casing, dried cotton and air discharging means at the lower end of said casing, and retarding means located in the space between the free end of at least one of the floors and the adjacent wall of the casing and between the free end of the floor and the subjacent floor.

3. In a device of the character described, a vertically elongated substantially air-tight casing, a plurality of vertically spaced floors mounted in said casing, major portions of said floors being horizontal, said floors having one end thereof secured to the wall of the casing and the opposite end spaced from the opposite wall of the casing with the free ends of adjacent floors staggered with respect to each other, a combined moist cotton and drying air inlet at the top of the casing, dried cotton and air discharging means at the lower end of said casing, and retarding means located in the space between the free end of at least one of the floors and the adjacent wall of the casing and between the free end of the floor and the subjacent floor, said retarding means comprising a horizontal roller having axially and circumferentially spaced spikes on the surface thereof, and means for rotating the roller at a controlled speed.

4. In a device of the character described, a vertically elongated substantially air-tight casing, a plurality of vertically spaced floors mounted in said casing, major portions of said floors being horizontal, said floors having one end thereof secured to the wall of the casing and the opposite end spaced from the opposite wall of the casing with the free ends of adjacent floors staggered with respect to each other, a combined moist cotton and drying air inlet at the top of the casing, dried cotton and air discharging means at the lower end of said casing, and retarding means located in the space between the free end of at least one of the floors and the adjacent wall of the casing and between the free end of the floor and the subjacent floor, said retarding means comprising first and second horizontal rollers having axially and circumferentially spaced spikes on the surface thereof, said first roller being disposed relative to said one floor and said second roller being similarly disposed relative to a lower floor.

5. In a device of the character described, a vertically elongated substantially air-tight casing having a combined moist cotton and drying air inlet at its upper end and a cotton and air outlet at its lower end, a plurality of vertically spaced drying floors positioned in said casing between said inlet and said outlet, major portions of said floors being horizontal, alternate ones of said floors being attached at one end to the wall of the casing and spaced at the opposite end from the opposite wall of the casing with the free ends of vertically adjacent floors staggered with respect to each other, and a spike-equipped cotton retarding roller located in the space defined between the free end of at least one of the floors and the adjacent wall of the casing and the next floor below.

6. In a device of the character described, a vertically elongated substantially air-tight casing having a combined moist cotton and drying air inlet at its upper end and a cotton and air outlet at its lower end, a plurality of vertically spaced drying floors positioned in said casing between said inlet and said outlet, each floor consisting of an inwardly declining portion attached at its elevated end to the casing wall and a horizontal portion projecting from the depressed end of said declining portion toward the opposite casing wall, the terminal end of said horizontal portion being unattached to and substantially spaced from said opposite casing wall, the positions of vertically alternating ones of said floors being reversed whereby the unattached ends of the horizontal portions of adjacent floors are staggered with respect to each other to provide a tortuous passage from said inlet toward said outlet, and spike equipped cotton retarding roller located in the space defined between the terminal end of the horizontal portion of at least one of said floors and the adjacent wall of the casing and overlying the declining portion of the subjacent floor.

ROBERT M. JOYCE.